United States Patent [19]
Yamamoto

[11] Patent Number: 5,752,178
[45] Date of Patent: May 12, 1998

[54] WAVEFORM IDENTITY DISCRIMINATING CIRCUIT

[75] Inventor: Yuji Yamamoto, Saitama, Japan

[73] Assignee: Pioneer Electronic Corporation, Tokyo, Japan

[21] Appl. No.: 730,817

[22] Filed: Oct. 17, 1996

[30] Foreign Application Priority Data

Oct. 26, 1995 [JP] Japan ................................ 7-278713
Nov. 13, 1995 [JP] Japan ................................ 7-294070

[51] Int. Cl.$^6$ .................................................. H04B 1/18
[52] U.S. Cl. ........................... 455/186.1; 455/226.2
[58] Field of Search ....................... 455/186.1, 226.1, 455/226.2, 307; 329/9

[56] References Cited

U.S. PATENT DOCUMENTS

| | | | |
|---|---|---|---|
| 5,193,210 | 3/1993 | Nicholas et al. | 455/226.1 |
| 5,471,662 | 11/1995 | Shiota | 455/186.1 |
| 5,551,071 | 8/1996 | Nakano et al. | 455/186.1 |
| 5,640,697 | 6/1997 | Orndorff | 455/186.1 |

FOREIGN PATENT DOCUMENTS 60-224318  11/1985  Japan ................ H03J 7/18

OTHER PUBLICATIONS

IBM Technical Disclosure Bulletin, "Measurement of Motor Time constant", by W.L. Lohmeier, Nov. 1971.

Primary Examiner—Reinhard J. Eisenzopf
Assistant Examiner—Edan Orgad
Attorney, Agent, or Firm—Sughrue, Mion, Zinn, Macpeak & Seas, PLLC

[57] ABSTRACT

A waveform identity discriminating circuit to discriminate the identity of two signal waveforms one of which is selected only for a very short period of time for discriminating the identity, wherein sample-and-hold circuits directly receive the selected input signals and sample each of the input signals in response to a sampling command and holds the sampled values, a discriminating circuit discriminates whether or not the waveforms of the input signals are identical by comparing the sampled values of the input signals held by the sample-and-hold circuits and a sampling timing detecting circuit monitors the frequency distribution pattern of the input signal and detects whether or not there are contained frequency components of a predetermined bandwidth by an amount at or above predetermined value, wherein the sampling timing of the sample and hold is controlled by the output of the sampling timing detecting circuit.

7 Claims, 7 Drawing Sheets

FIG. 3A SAMPLING PULSE

FIG. 3B SAMPLING TIMING PULSE P

FIG. 3C OUTPUT OF GATE CIRCUIT $13_1$

FIG. 10B
PRIOR ART

WAVEFORM IDENTITY DISCRIMINATING CIRCUIT

BACKGROUND OF THE INVENTION

1. Field of the Invention

This invention relates to a waveform identity discriminating circuit for identifying if two input signals have a same waveform or not and, more particularly, it relates to a waveform identity discriminating circuit to be suitably used as means for identifying a same program in an FM radio receiving set equipped with a radio data system (RDS).

2. Description of the Prior Art

An FM radio receiving set equipped with a radio data system can automatically select an optimal radio broadcasting station among the stations transmitting the same programs if it misses the current station because it is a car radio and moving out of the service area of the current station or losing its sensitivity to that station for some other reasons. The applicant of the present patent application has proposed a radio receiving set capable of automatically selecting an optimal broadcasting station by comparing the demodulated waveform of the signal of the program received from the current broadcasting station and that of the signal of the program received from another station that can be selected (Japanese Patent Application Laid-Open No. 60-224318).

Figure 7:
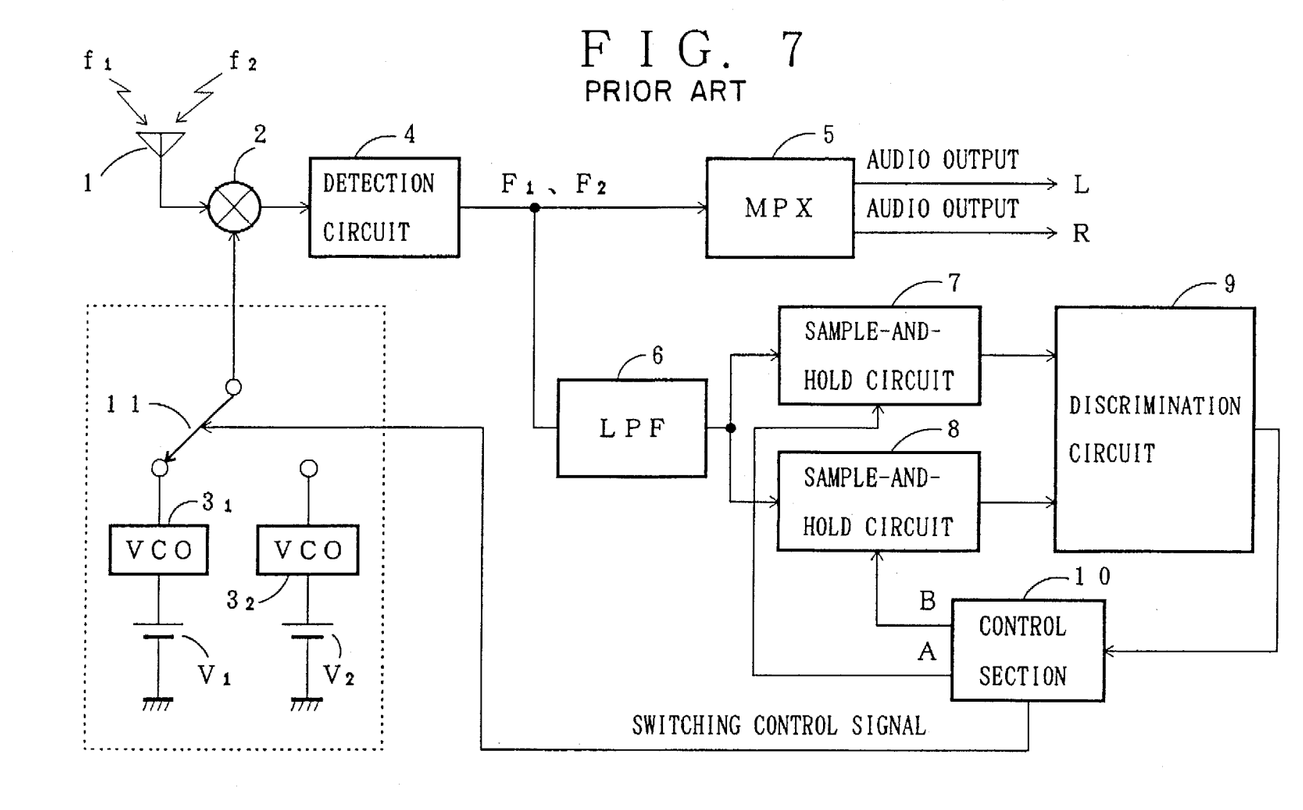
FIG. 7 is a block diagram of a conventional waveform identity discriminating circuit.

FIG. 7 of the accompanying drawings is a schematic block diagram of a waveform identity discriminating circuit to be used in a prior art FM radio receiving set capable of automatically selecting an optimal radio broadcasting station according to the above patent application.

Referring to FIG. 7, there are shown an antenna 1, a frequency mixer 2 for producing an intermediate frequency (IF) and a first voltage-controlled oscillator (VCO) $3_1$ operating as a local oscillator whose oscillation frequency can be modified by changing the voltage being applied to it. The broadcast signal carried by a carrier wave and received by the antenna 1 is fed to the frequency mixer 2, where it is mixed with the local oscillation signal coming from the $VCO3_1$ and modulated to a predetermined intermediate frequency before being supplied further to a detection circuit 4. The signal demodulated at the detection circuit 4 is then fed to a multiplexing circuit (MPX) 5 and divided into left and right stereo signals L and R, which are produced as a set of audio signals. The above described circuit configuration is not particularly different from those of comparable known FM radio receiving sets.

However, the FM radio receiving set of FIG. 7 additionally has a waveform identity discriminating circuit according to the above cited patent application that is comprised of a second local oscillator $VCO3_2$ for tuning in another station transmitting the same program (hereinafter referred to as alternative station), a switch 11 for selecting either the $VCO3_1$ or the $VCO3_2$, a low pass filter (LPF) 6 connected to the output terminal of the detection circuit 4 in order to prevent aliasing noise from occurring due to signal sampling, a pair of sample-and-hold circuits 7 and 8 connected to the output terminal of the LPF 6 and a discriminating circuit 9 connected to the output terminals of the sample-and-hold circuits 7 and 8 for discriminating if the demodulated waveform of the signal from the current station is the same as or different from that of the signal from the alternative station.

The circuit comprises a control section 10 that generates a first sampling pulse A for sampling the demodulated signal of the current station that is currently being received and a second sampling pulse B for sampling the demodulated signal of the alternative station and sends out a switching control signal for controlling the switching operation of the switch 11. Further, the LPF 6 is so designed that it only passes a frequency bandwidth less than one half of the sampling frequency of the sampling pulses A and B.

The operation of the waveform identity discriminating circuit of the above described prior art FM radio receiving set will now be described by referring to the timing chart of FIG. 8A–FIG. 8F. It is assumed that control voltage $V_1$ is applied to the $VCO3_1$ for receiving a signal with transmission frequency $f_1$ from the current station and control voltage $V_2$ is applied to the $VCO3_2$ for receiving a signal with transmission frequency $f_2$ from the alternative station. It is also assumed that the detection circuit 4 produces a demodulation output $F_1$ upon receiving a signal with transmission frequency $f_1$ from the current station (see FIG. 8A) and a demodulation output $F_2$ upon receiving a signal with transmission frequency $f_2$ from the alternative station (see FIG. 8B).

So long as the signal from the current station is received in good condition, the switch 11 is set on the side of the $VCO3_1$ to receive the signal with transmission frequency $f_1$ from the current station. When the electric field intensity of the signal falls down below a threshold level, the waveform identity discriminating circuit operates in a manner as described below to discriminate whether or not the alternative station transmits the same waveform and, if the identity of the waveform is confirmed, switch the reception frequency to the latter smoothly.

Figure 8A:
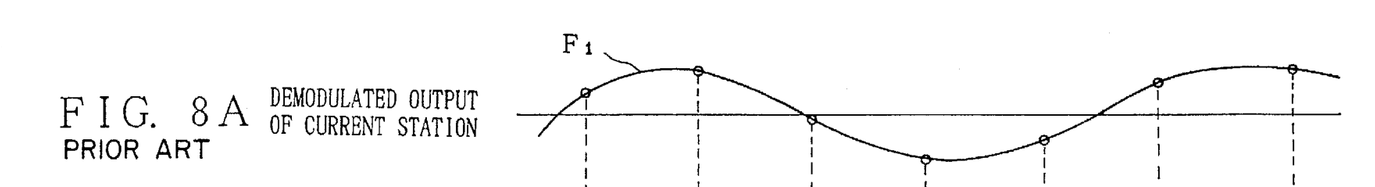
FIGS. 8A–8F are timing charts for illustrating the operation of the conventional circuit of FIG. 7.
Figures 8B, 8C:
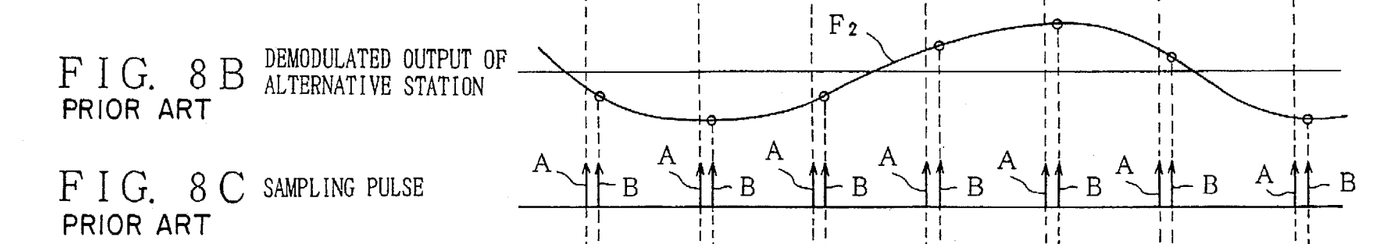
Figure 8D:
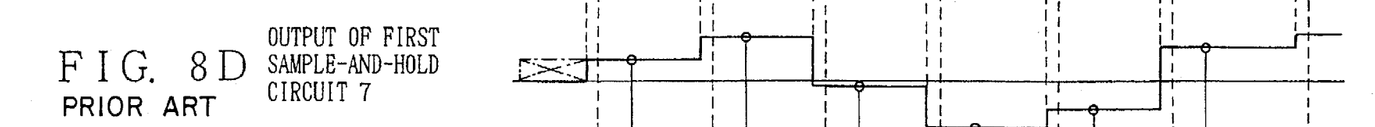
Figure 8E:
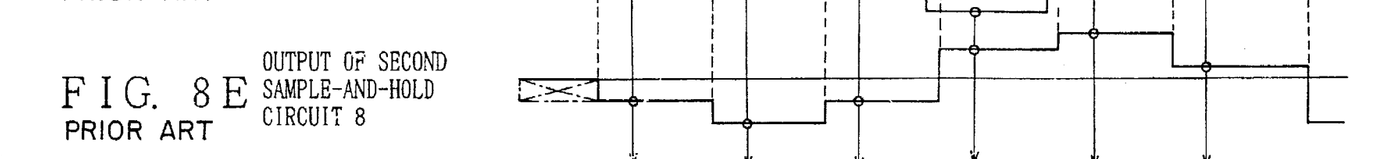

Firstly, the control section 10 generates a first sampling pulse A and a second sampling pulse B having a predetermined sampling period as indicated by FIG. 8C and sends the first sampling pulse A to the first sample-and-hold circuit 7 and that the second sampling pulse B to the second sample-and-hold circuit 8. It then sends a switching control signal to the switch 11 to switch the $VCO3_1$ to $VCO3_2$.

Upon receiving the first sampling pulse A, the first sample-and-hold circuit 7 samples the demodulated output of the current station and holds the sampled signal (see FIG. 8D), while it also sends it to the discriminating circuit 9. On the other hand, the switch 11 switches the local oscillator from $VCO3_1$ to $VCO3_2$ when it receives the switching control signal.

The second sampling pulse B is generated when the oscillation frequency of the newly selected $VCO3_2$ is brought into a stable state and transmitted from the control section 10 to the sample-and-hold circuit 8. Upon receiving the second sampling pulse B, the second sample-and-hold circuit 8 samples the demodulated output $F_2$ of the alternative station and holds the sampled signal (see FIG. 8E) and supplies it to the discriminating circuit 9.

Figure 8F:
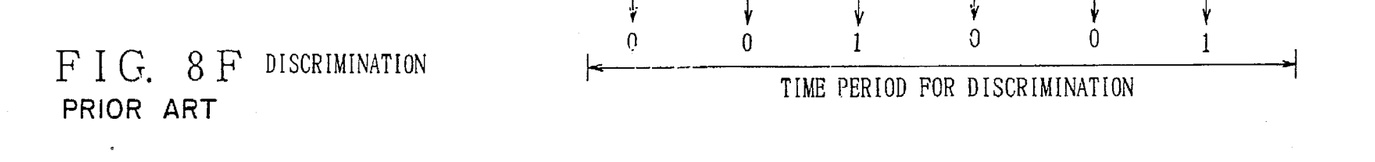

After elapsing a predetermined period of time from the time when both the sampling pulses A and B are sent out, as shown in FIG. 8F, the discriminating circuit 9 detects the polarity of the sampled signal values which are held by the sample-and-hold circuits 7 and 8 whether or not there is a coincidence. The discriminating circuit 9 is so designed that it outputs an output of "1" when the two polarities coincides with each other while an output of "0" when they do not coincide with each other. A number of the outputs "1" and "0" are thus counted for a predetermined discrimination period of time. At the time when the discrimination period of time is over, if the number of the outputs "1" exceeds a predetermined number, the circuit 9 discriminates that the current station and the alternative station are transmitting the same program. In case of FIG. 8F, the number of "1" is two and that of "0" is four and, therefore, the waveforms of the two stations are discriminated to be different from each other.

The above described prior art waveform identity discriminating circuit discriminates whether the two stations are transmitting the same program or not in this way. Then, it switches the reception to the alternative station provided that the electric field intensity of the signal of the alternative station is greater than that of the signal of the current station.

Figure 9A:
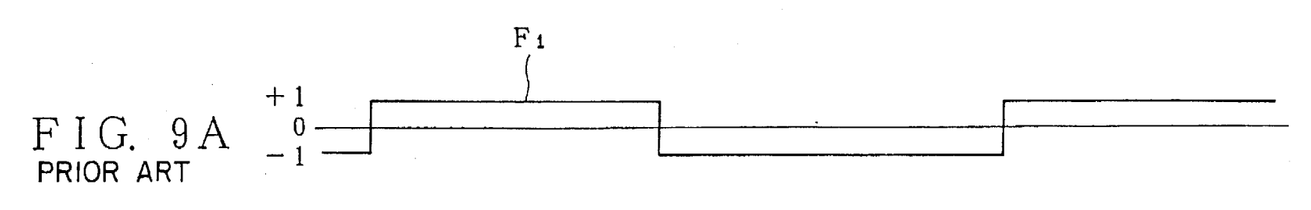
FIGS. 9A–9B are diagrams showing how demodulated outputs are converted into binary waveforms.
Figure 9B:
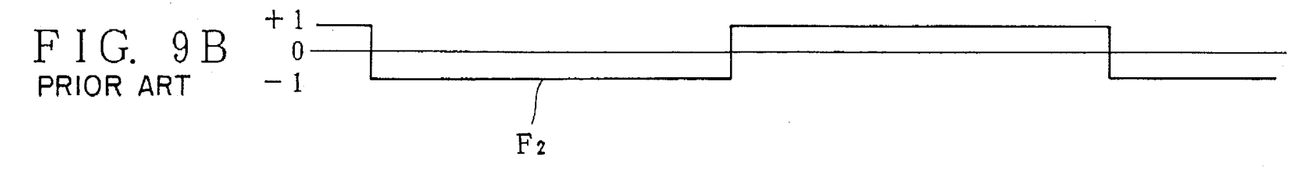

While the wave height values of the demodulated outputs $F_1$ and $F_2$ of the sample-and-hold circuits 7 and 8 are sampled without modification in the circuit of FIG. 7, a limiter is arranged after the LPF 6 in order to simplify the waveform discriminating operation of the discriminating circuit 9 in actual radio receiving sets so that the demodulated outputs $F_1$ and $F_2$ are converted into binary waveforms such as indicated by FIGS. 9A and 9B for the ease of sampling and waveform discrimination.

As the demodulated outputs $F_1$ and $F_2$ are converted into binary waveforms, the value of each of the sampled waveforms which are held in the sample-and-hold circuits 7 and 8 will be either +1 or −1. Thus, the waveform discriminating operation of the discriminating circuit 9 will be greatly simplified.

Note that the local oscillation circuit including $VCO3_1$ and $VCO3_2$, the switch 11 and the control voltages $V^1$ and $V_2$ and surrounded by dotted lines in FIG. 7 is realized in the form of a frequency synthesizer using a PLL circuit in actual FM radio receiving sets of the type under consideration.

Figure 10A:
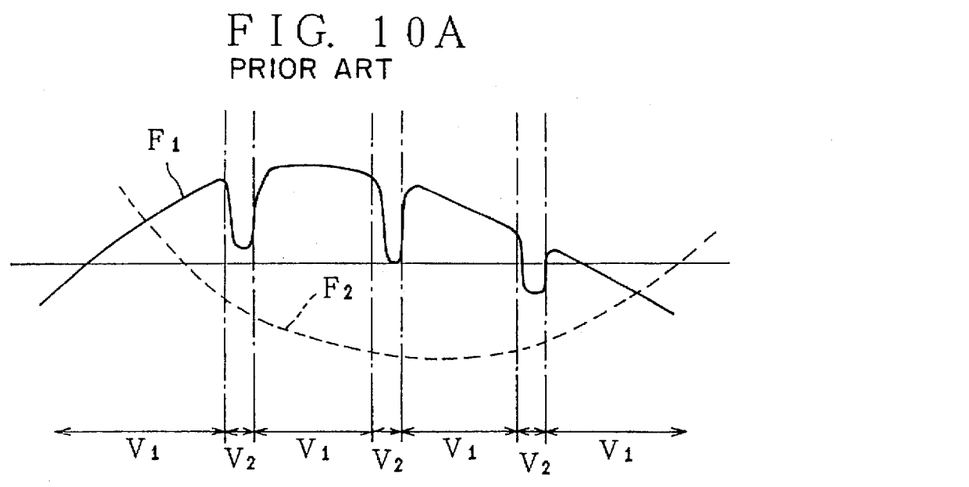
FIGS. 10A–10B are diagrams showing the waveforms of the demodulated outputs of the conventional circuit of FIG. 7 and comparable ideal waveforms.
Figure 10B:
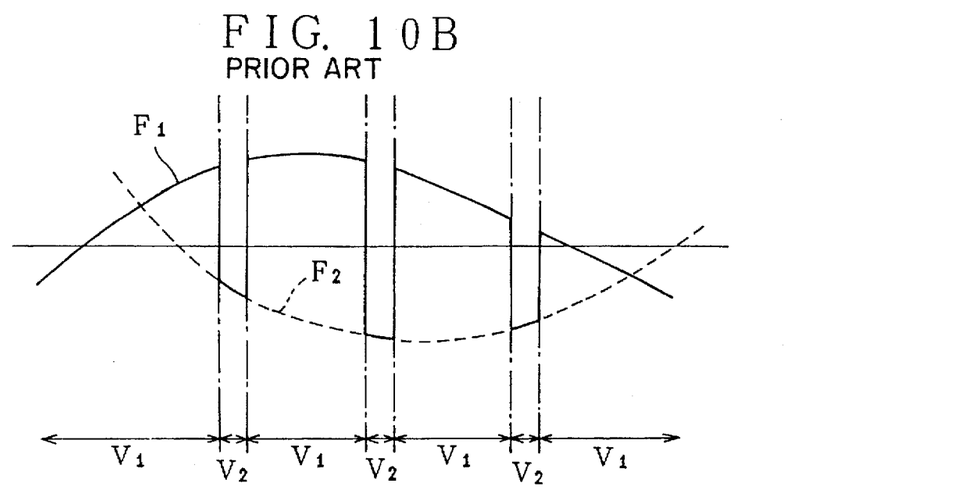

The switch 11 of the above described circuit is turned on the side of the $VCO3_2$ and held there for such a very short period of time that would not produce any switching noise of selecting the alternative station through the loud speaker of the radio receiving set as seen from FIG. 10. This is necessary in order to prevent the listener from failing to listen to the program being transmitted from the current station during the switching operation.

On the other hand, the LPF 6 is connected in front of the first and second sample-and-hold circuits 7 and 8 in order to prevent aliasing noise from occurring and has a time constant. Therefore, if the switch 11 is switched to the side of the $VCO3_2$ for a very short period of time, the demodulated output $F_2$ of the signal from the alternative station is deformed as typically indicated by FIG. 10A, although the current station should be switched to the alternative station ideally without any deformation of the waveforms of the demodulated outputs $F_1$ and $F_2$ of the signals from the respective stations as indicated by FIG. 10B. This sort of deformation can give rise to errors in determining the identity of the signal waveforms of the two stations.

The simplest way of eliminating this problem may be provided by making the time period required by the operation of the switch 11 for shifting to the $VCO3_2$ longer than a time constant of the LPF 6. However, a prolong time for switching to the side of the $VCO3_2$ by the operation makes a switching noise of the switch 11 that is otherwise noticeable and clearly audible to the listener and, if the alternative station being searched is not transmitting the same program, the sound of the program of the selected alternative station is transmitted to the listener as a noise every time the switch 11 is operated.

It is therefore an object of the present invention to eliminate the above identified problems and to provide a waveform identity discriminating circuit that can accurately confirm the identity of two signal waveforms if either one of the signals is selected only for a very short period of time for discriminating the identity of the waveforms.

SUMMARY OF THE INVENTION

According to the present invention, the above objective is achieved by providing a waveform identity discriminating circuit for receiving a plurality of input signals for waveform comparison in a selective manner by switching, sampling the selected input signals and comparing the sampled values of the selected input signals to discriminate the identity of the waveforms of the input signals, said circuit comprising a sampling means for directly receiving the selected input signals and sampling each of the input signals according to a sampling command and for holding the sampled values, a discriminating means for discriminating whether or not the waveforms of the input signals are identical by comparing the sampled values of the input signals which are held by said sampling means and a sampling timing detecting means for monitoring the frequency distribution patterns of said input signals and detecting whether or not there are contained frequency components of a predetermined bandwidth by an amount at or above predetermined value, wherein the sampling timing of said sampling means is controlled by the output of said sampling timing detecting means.

With a waveform identity discriminating circuit having a configuration as described above, the input signal is directly fed to the sampling means without passing through a low pass filter and, therefore unlike a comparable known circuit, not affected by a time constant of the low pass filter. Thus, two input signals can be accurately checked for the identity of their waveforms even if they are switched for the discriminating process for a very short period of time.

In another aspect of the present invention, a waveform identity discriminating circuit as in a configuration as described above, the input signals may be of demodulated signals of radio broadcasting. In this configuration, the identity of two programs can be discriminated prior to demodulating a PI code from the received signal in an FM radio receiving set comprising an RDS function.

Further, in a waveform identity discriminating circuit of the above described configuration in accordance with the present invention, the separation control operation may be carried out synchronously with the sampling command being applied to said sampling means. Then, an audio output of the radio receiver is free from instability or wobbling causing from abnormal fluctuations during the operation of the separation control that may occur when the input signals are switched from one to the other, so that the radio receiver can reproduce the sound of the program on a stable basis.

DETAILED DESCRIPTION OF THE PREFERRED EMBODIMENT

Now, the present invention will be described by referring to the accompanying drawings that illustrate a preferred embodiment of the invention.

Figure 1:
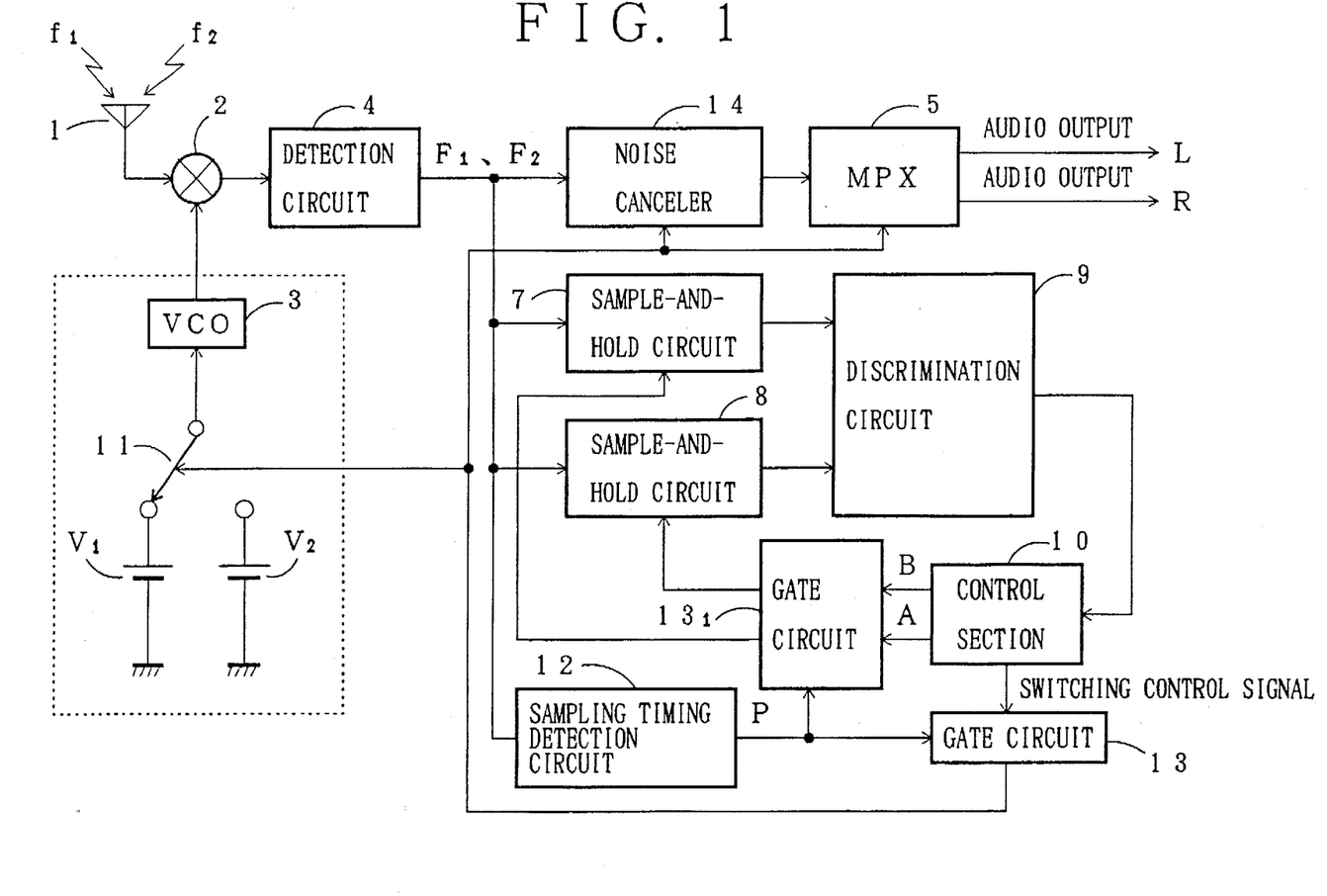
FIG. 1 is a block diagram of an embodiment of waveform identity discriminating circuit according to the invention.

FIG. 1 is a block diagram of the embodiment of the present invention showing a waveform identity discriminating circuit used in an FM radio receiver. Note that the components that are the same as or similar to their counterparts of the conventional circuit of FIG. 7 are denoted respectively by the same reference numerals and would not be described any further.

This embodiment of waveform identity discriminating circuit differs from the conventional circuit of FIG. 7 in that the LPF 6 of the latter is replaced by a sampling timing detection circuit 12 for constantly monitoring the demodulated output of the detection circuit 4 and sending out a sampling timing pulse only when the demodulated output shows a frequency distribution pattern suited for a sampling operation, a gate circuit $13_1$ for passing/blocking sampling pulses A and B transmitted from the control section 10 and another gate circuit $13_2$ for passing/blocking a switching control signal also transmitted from the control section 10 and the gate circuits $13_1$ and $13_2$ are opened only when a sampling timing pulse is produced by the sampling timing detection circuit 12.

Note that a single VCO3 is used as a local oscillator in the circuit of FIG. 1 in order to reduce the dimensions of the circuit. Either one of the control voltages $V_1$ and $V_2$ being applied to the VCO3 is selectively used by the switch 11 in order to switch from the current station to the alternative station or vice versa. Note that the local oscillation circuit including the VCO3, the switch 11 and the control voltages $V_1$ and $V_2$ and surrounded by dotted lines in FIG. 7 is realized in the form of a frequency synthesizer using a PLL circuit in actual FM radio receivers comprising a waveform identity discriminating circuit according to the present invention.

Figure 2:
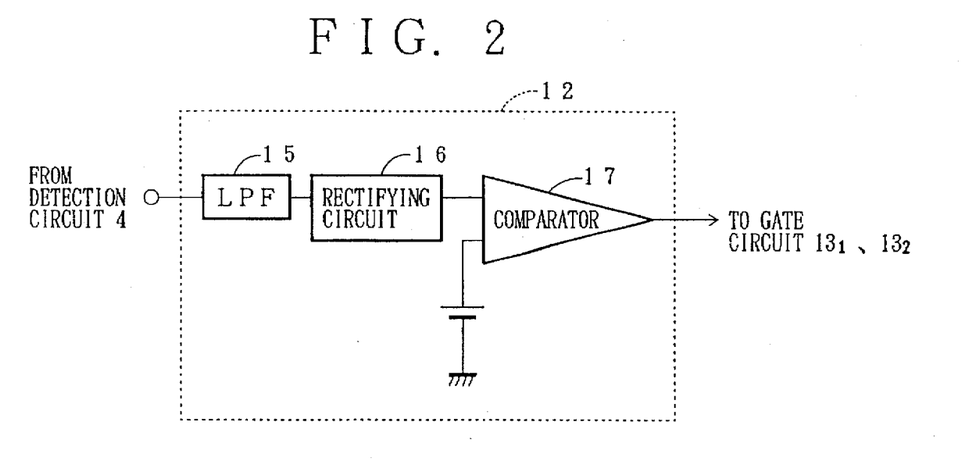
FIG. 2 is a circuit diagram of a sampling timing circuit of FIG. 1.

FIG. 2 shows a circuit diagram that can be used for the sampling timing detection circuit 12.

The circuit comprises a low pass filter (LPF) 15, a rectifying circuit 16 and a level comparator 17. The LPF 15 of this circuit operates same as the LPF 6 of FIG. 7. The LPF 15 monitors the frequency distribution of the demodulated output $F_1$ of the signal of the current station that is currently being received.

The output of the LPF 15 is relatively small when the demodulated output contains high frequency components that adversely affect the sampling operation to a large extent, whereas the output of the LPF 15 is increased when the demodulated output contains low frequency components that do not adversely affect the sampling operation. Thus, it can be determined if the output of the LPF 15 contains high frequency components to a small extent and, hence, is good for sampling operation or not by converting the output of the LPF 15 into a DC voltage by means of the rectifying circuit 16 and comparing the obtained DC voltage with a predetermined reference voltage.

Figure 3A:
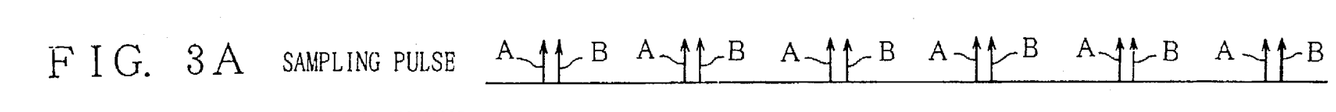
FIG. 3A–3C are timing charts for illustrating the operation of the circuit of FIG. 1.

The embodiment of waveform sameness determining circuit according to the present invention and having the above described configuration operates in a manner as described below by referring to the timing chart of FIGS. 3A–3C.

The sampling timing detection circuit 12 monitors the frequency distribution of the demodulated output $F_1$ of the signal of the current station that is currently being received. When the frequency distribution of the demodulation output is found to be good for sampling operation and the signal contains high frequency components only to a small extent, the circuit 12 generates a sampling timing pulse P and transmits it to the gate circuits $13_1$ and $13_2$.

Figure 3B:
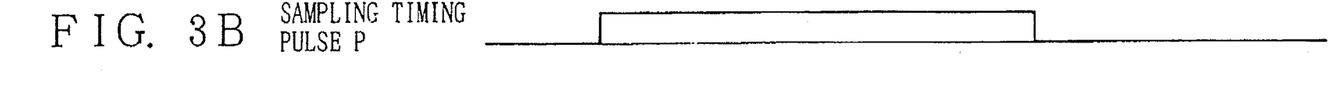
Figure 3C:
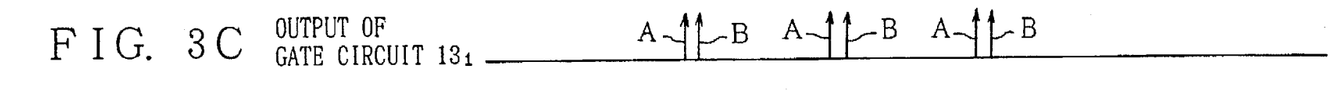

Upon receiving the sampling timing pulse P, the gate circuit $13_1$ opens its gate to selectively send out the sampling pulses A and B it receives from the control section 10 as indicated by FIG. 3C to the sample-and-hold circuits 7 and 8 as long as it keeps on receiving the sampling timing pulse P indicated by FIG. 3B. On the other hand, the gate circuit $13_2$ sends out a switching control signal to the switch 11 only when it receives the sampling timing pulse P.

Thus, the sample-and-hold circuits 7 and 8 and the switch 11 are operated only when the aliasing noise due to the sampling operation is very small to minimize the influence of aliasing noise without using an LPF 6 as in the case of the prior art circuit (FIG. 7).

Figure 4:
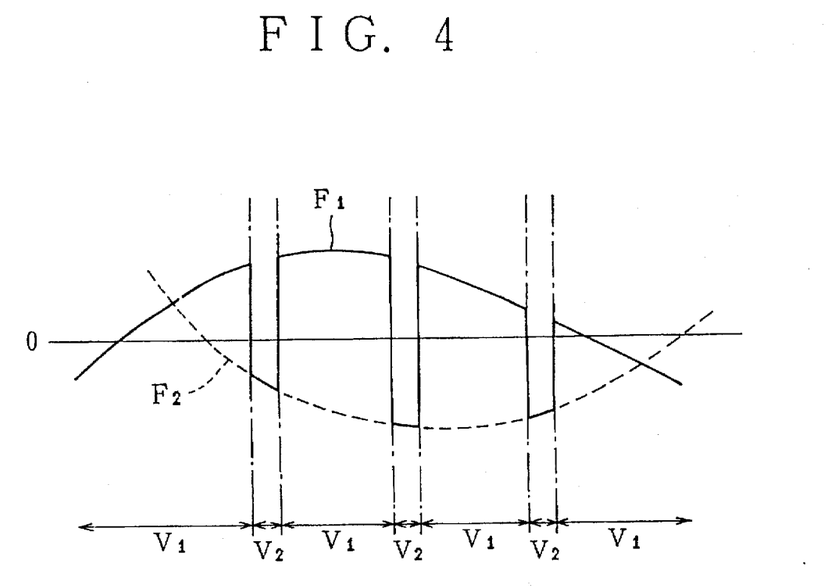
FIG. 4 is a schematic diagram of waveforms of the demodulation outputs of the circuit of FIG. 1 when the circuit is switched from one of the outputs to the other.

More importantly, since no LPF is arranged in front of the sample-and-hold circuits 7 and 8 unlike the prior art circuit, the circuit is not adversely affected by the time constant of an LPF even if the switch 11 is turned to the $V_2$ side for a very short period of time so that the demodulated outputs of the detection circuit 4 will show a waveform as illustrated in FIG. 4, where the waveform of the demodulated output $F_2$ of the signal waveform of the signal from the current station and that of the signal from the alternative station can be accurately checked for the identity of waveforms.

A noise canceler (NC) 14 of a known type is arranged between the detection circuit 4 and the multiplexing circuit 5 in the circuit of FIG. 1. When the radio receiver receives a pulse that is most probably a noise, the noise canceler 14 holds the audio output of the radio receiver to a value immediately before receiving the noise to prevent the pulse noise from being added to the audio output. In the circuit of FIG. 1, this noise canceler 14 is used to block any switching noise that can occur when the reception is switched to the alternative station.

Figure 5:
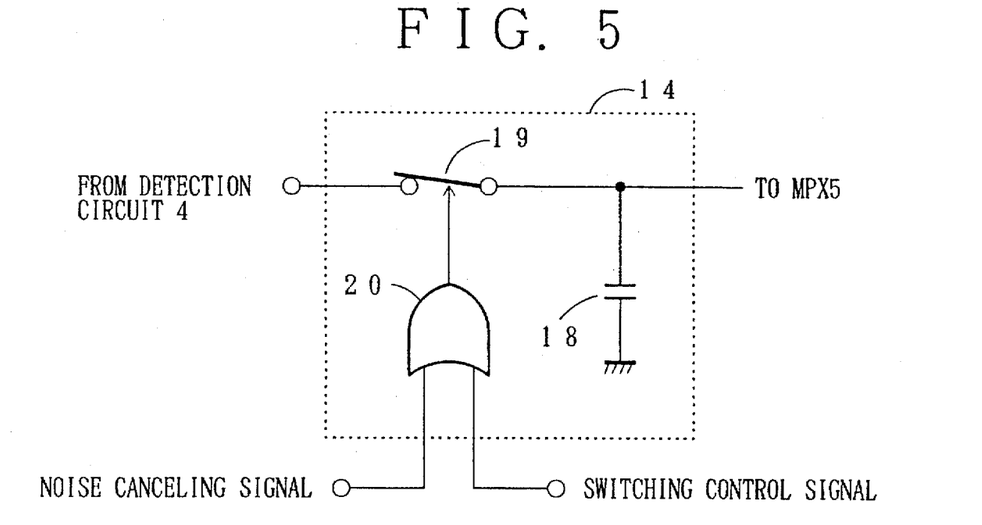
FIG. 5 is a circuit diagram of the noise canceler of FIG. 1.

FIG. 5 is a circuit diagram of the noise canceler 14 of FIG. 1. The noise canceler 14 comprises a capacitor 18 for holding the immediately preceding output value, a switch 19 and an OR-gate 20 and a noise canceling signal of a known type is applied to one of the input terminals of the OR-gate 20 while a switching control signal is applied to the other input terminal. The switch 19 is turned off when the noise canceler 14 receives a noise canceling signal or a switching control signal so that the signal transmission along the audio signal line is interrupted and the demodulated output held by the capacitor 18 immediately before the switch being turned off is produced as the output of the radio receiver to eliminate the noise.

A separation control circuit is contained in the multiplexing circuit 5 of FIG. 1 and controlled by a switching control signal.

Figure 6:
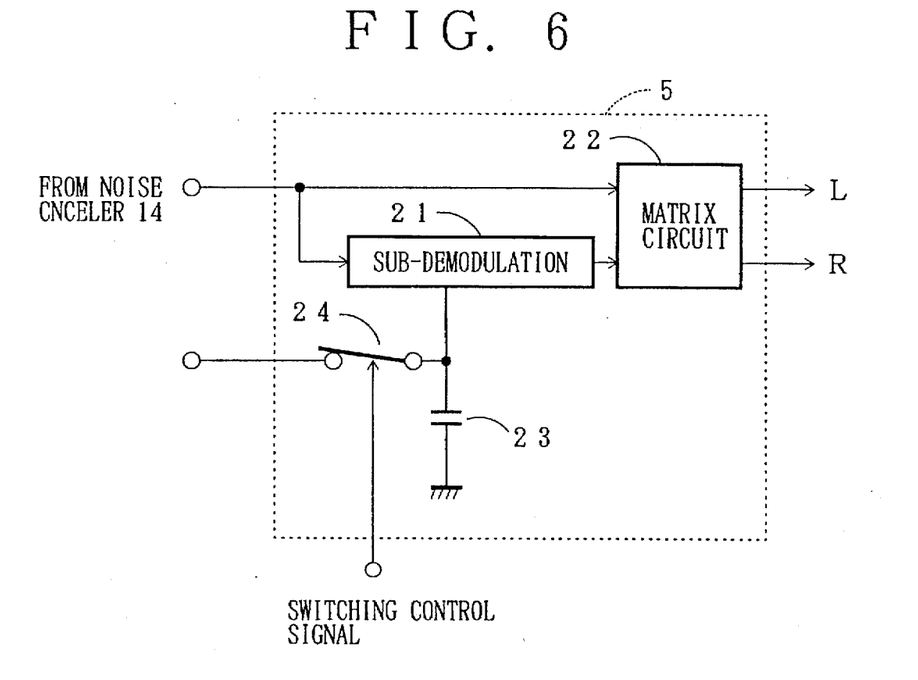
FIG. 6 is a circuit diagram of the multiplexing circuit of FIG. 1.

FIG. 6 is a circuit diagram of the multiplexing circuit of FIG. 1, that contains therein a separation control circuit.

The multiplexing circuit 5 comprises a sub-demodulation circuit 21, a matrix circuit 22, capacitor 23 for holding a control voltage and a switch 24 and, normally, the circuit operates for separation control according to the electric field intensity of the received signal. Upon receiving a switching control signal, it turns off the switch 24 and the separation control voltage immediately before the switch 24 being turned off is securely held by the capacitor 18. Thus, the audio output of the radio receiver is free from instability or wobbling due to abnormal fluctuations during the operation of the separation control that may occur when the switch 11 is operated so that the radio receiving set can reproduce the sound of the program on a stable basis.

While the sample-and-hold circuits 7 and 8 of the above embodiment directly sample the demodulated outputs $F_1$ and $F_2$ of the detection circuit 4 as in the case of the conventional circuit of FIG. 7, a circuit for converting the demodulated outputs $F_1$ and $F_2$ into binary waveforms such as a limiter may be arranged on the signal line connecting the detection circuit 4 and the sample-and-hold circuits 7 and 8 or in each of the sample-and-hold circuits 7 and 8 as typically indicated by FIGS. 9A and 9B. Then, the waveform discriminating operation of the discriminating circuit 9 will be greatly simplified as described earlier by referring to FIG. 7.

Advantages of the Invention

As described above in detail, the present invention provides a waveform identity discriminating circuit for receiving a plurality of input signals for waveform comparison in a shiftable and selective manner, sampling the input signals and comparing the sampled values of the different input signals to determine the identity of the waveforms of the input signals, said circuit comprising a sampling means for directly receiving the selected input signals, sampling each of the input signals in response to a sampling command and holding the sampled values, a discriminating means for discriminating whether or not the waveforms of the input signals are the same or different by comparing the sampled values of the input signals held by said sampling means, and a sampling timing detecting means for monitoring the frequency distribution pattern of said input signals and detecting whether or not there are contained frequency components of a predetermined bandwidth by an amount at or above predetermined value, wherein the sampling timing of said sampling means is controlled by the output of said sampling timing detecting means. With the above arrangement, the input signal is directly fed into the sampling means without passing through a low pass filter and, therefore unlike a comparable conventional circuit, not affected by the time constant of the low pass filter. Thus, two input signals can be accurately checked for the identity of their waveforms even if they are switched for a very short period of time in the discriminating process.

Since the input signals to a waveform identity discriminating circuit, in accordance with the present invention, are of demodulated signals of received radio broadcast, the identity of two broadcasting programs can be discriminated prior to demodulating the PI codes in an FM radio receiver comprising an RDS function.

Further, since the separation control operation of said circuit is carried out in synchronism with the sampling command applied to said sampling means, it is possible to eliminate the instability or wobbling of the reproduced audio signal causing from the abnormal fluctuations in the operation of separation control that may be caused when the input signals are switched from one to the other so that the radio receiver can reproduce the sound of the program on a stable basis.

While the present invention has been described in detail by referring to a preferred embodiment of the invention, the present invention is not limited thereto by any means and the embodiment may be changed or modified in many different ways without departing from the spirit and the scope of the invention.

What is claimed is:

1. A waveform identity discriminating circuit for receiving a plurality of input signals to be compared being selected by switching, sampling the input signals and comparing the sampled values thereof to discriminate the identity of waveforms of the input signals, said circuit comprising:

sampling means for directly receiving the selected input signals, sampling each of the input signals according to a sampling command and holding the sampled values;

discriminating means for discriminating whether or not the waveforms of the input signals are identical by comparing the sampled values of the input signals held by said sampling means; and sampling timing detecting means for monitoring the frequency distribution pattern of said input signals and detecting whether or not there are contained frequency components of a predetermined bandwidth by an amount at or above a predetermined value, wherein the sampling timing of said sampling means is controlled by an output of said sampling timing detecting means.

2. A waveform identity discriminating circuit according to claim 1, wherein said input signals are demodulated signals of radio broadcasts.

3. A waveform identity discriminating circuit according to claim 2, wherein the separation control operation of said demodulated signals is implemented in synchronism with the sampling command applied to said sampling means.

4. A waveform identity discriminating circuit according to claim 1, wherein said sampling timing detection means includes a low pass filter, a rectifier and a comparator.

5. A waveform identity discriminating circuit according to claim 1, further includes noise canceling means to be controlled in response to said sampling command for eliminating a switching noise being caused in the operation of selecting input signals.

6. A waveform identity discriminating circuit according to claim 1, further includes means for converting said input signals into binary waveforms.

7. A waveform identity discriminating circuit according to claim 2, further includes means for converting said input signals into binary waveforms.

\* \* \* \* \*